United States Patent [19]

Ball et al.

[11] Patent Number: 5,096,617

[45] Date of Patent: Mar. 17, 1992

[54] DEFOAMER EMULSION

[75] Inventors: Lawrence E. Ball, Akron; Philip Smith, Mogadore, both of Ohio; Robert O. Rau, Greenville, S.C.

[73] Assignee: The BFGoodrich Company, Akron, Ohio

[21] Appl. No.: 528,675

[22] Filed: May 24, 1990

[51] Int. Cl.$^5$ .............................. B01D 17/00
[52] U.S. Cl. ................... 252/358; 252/321
[58] Field of Search ............... 252/358, 321

[56] References Cited

U.S. PATENT DOCUMENTS

| | | | |
|---|---|---|---|
| 3,990,905 | 11/1976 | Wachala et al. | 127/44 |
| 4,274,977 | 6/1981 | Koerner et al. | 252/358 |
| 4,696,761 | 9/1987 | Haubennestel et al. | 252/358 |
| 4,946,625 | 8/1990 | O'Lennick, Jr. | 252/358 |

Primary Examiner—Robert L. Stoll
Assistant Examiner—N. Bhat
Attorney, Agent, or Firm—George W. Moxon

[57] ABSTRACT

A mixture in-oil antifoam composition comprising a mixture of a defoaming agent comprising a defoamer in an oil carrier, a non-ionic surfactant having an HLB number less than about 10, and water. In particular, the defoamer is particulate hydrophobic silica dispersed in oil and the non-ionic surfactant has an HLB number of between 2 to 8.

10 Claims, No Drawings

DEFOAMER EMULSION

BACKGROUND OF THE INVENTION

The present invention relates to a water-in-oil emulsion antifoaming composition. In particular, a water-in-oil emulsion antifoam composition containing a nonionic surfactant, water and an antifoaming agent comprising hydrophobic silica in an oil carrier.

Antifoaming compositions are materials used in the prevention, removal and control of unwanted foam. Foamed fluids are dispersions of air or other gas as the discontinuous phase in a continuous liquid phase. Usually, since air or gas makes up the larger volume portion of such a foam, the bubbles are separated only by a thin liquid film. Unwanted fluid foams are made up of numerous tiny bubbles of a mechanical or chemical origin which are generated within a liquid and which rise and accumulate at the liquid surface faster than they decay.

The fields in which unwanted foams are encountered are very diverse, with problems ranging from unesthetic foams to foams which are hazardous to health. The problems associated with foaming are common in polymerization, paint processing and application, fermentation, sugar-refining, oil drilling and refining, food preparation, paper manufacture, sewage disposal, textile dyeing, textile printing ink pastes, adhesive application and conversion of ores refined by flotation. Moreover, liquid coolants, hydraulic fluids, lubricants, aviation fuels and gas adsorption fluids may foam with undesirable results under conditions of operation. If not properly controlled, foam can reduce equipment capacity and increase processing time and expense, as well as cause other disadvantages.

Although foam can be controlled by making basic changes in the process itself, or by using mechanical defoaming equipment, chemical antifoaming compositions have proven to be the most effective and economical. By adding a chemical antifoam composition to the system, stabilized films are broken, causing the foam bubbles to decay, and thus substantially or completely defoaming the system.

Among the many chemical compositions which are known to be useful for the prevention and destruction of undesirable foams, some of the most effective and versatile antifoaming agents are antifoaming compositions comprising hydrophobic silica suspended in an organic carrier with a small amount of emulsifying material. For specific examples of these types of antifoaming compositions see U.S. Pat. No. 3,076,768, herein incorporated by reference. Other examples of antifoaming compositions can be found in U.S. Pat. Nos. 4,039,469 and 4,123,383 also incorporated by reference.

While the above antifoaming composition exhibits good antifoaming properties, they can be improved upon from the standpoint of performance and economics. The present invention is directed to an antifoaming composition having improved properties. In particular, the antifoam composition of the present invention has improved properties when used in defoaming of aqueous systems in general.

SUMMARY OF THE INVENTION

It is the primary object of the present invention to provide a water-in-oil emulsion antifoaming composition.

It is another object of the present invention to provide a process for preparation of a water-in-oil emulsion antifoaming composition.

Other objects, advantages and novel features of the invention will be apparent to those of ordinary skill in the art upon examination of the following detailed description of a preferred embodiment of the invention. To achieve the foregoing and other object and in accordance with the purpose of the present invention as embodied and broadly described herein, the antifoaming composition of the present invention comprises a water-in-oil emulsion comprising about 20 to 90 wt. % defoaming agent comprising a defoamer in an oil carrier, greater than zero to 10 wt. % nonionic surfactant and the remainder water.

In a preferred embodiment of the present invention the defoaming composition comprises 30 to 50 wt. % defoaming agent, 1 to 10 wt. % nonionic surfactant, and remainder water.

In an especially preferred embodiment of the present invention the antifoaming composition comprises about 35 to 45 wt. % defoaming agent, about 2 to 8 wt. % nonionic surfactant and remainder water.

In still another preferred embodiment of the present invention the defoaming agent is hydrophobic silica particles dispersed in an oil carrier.

In another preferred embodiment of the present invention the nonionic surfactant is a mixture of sorbitan fatty esters.

In another aspect of the present invention a process for making a water-in-oil antifoaming composition comprises combining 20 to 90 wt. % defoaming agent comprising a defoamer in an oil carrier, greater than 0 to 10 wt. % nonionic surfactant and remainder water and mixing the defoaming agent, nonionic surfactant and water to form a water-in-oil emulsion.

The antifoaming composition of the present invention is a water-in-oil emulsion. That is the oil is the continuous phase of the emulsion even though the oil is not present as a majority component in the composition.

Reference will now be made in detail to the present preferred embodiment of the present invention.

DETAILED DESCRIPTION OF THE INVENTION

The antifoam composition of the present invention comprising an oil-in-water emulsion comprising about 20 to 90 wt. % defoaming agent comprising a defoaming agent in an oil carrier, greater than zero to 10 wt. % nonionic surfactant and remainder water.

In particular, the defoamer comprises particulate hydrophobic silica.

The hydrophobic silica contemplated for use herein may be prepared from any of the well-known forms of silica such as (1) silica aerogel, a colloidal silica which may be prepared by displacing the water from a silica hydrogen by a low-boiling, water-miscible, organic liquid, heating in an autoclave or the like about the critical temperature of the liquid, and then venting the autoclave, (2) so-called fume silica, a colloidal silica obtained by burning silicon tetrachloride and collecting the resulting silica smoke and (3) a precipitated silica prepared by the "detabilization of a water-soluble silica under conditions which do not permit the formation of a gel structure, but rather cause the flocculation silica particles into coherent aggregates such as by the addition of sodium ions to a sodium silicate solution."

Any suitable method may be employed for treating the normally hydrophilic silica to render it hydrophobic. One method which has proved very satisfactory involves spraying the silica with silicone oil, i.e., dimethylpolysiloxane, and heating at elevated temperature,, i.e., from about 150° C. to about 350° C., for about ½ to 2 hours. The amount of silicone oil utilized may vary from about 5% to about 100% by weight based on the weight of the silica. However, amounts from about 7% to about 25% will usually be satisfactory and are preferred.

The finely divided silica may also be rendered hydrophobic by treatment with vapors of an organo-silicon halide or mixture of organo-silicon halides. Examples of organo-silicon halides suitable for this purpose are given in U.S Pat. Nos. 2,306,222 and 2,412,470 and include alkyl(methyl), aryl(phenyl), alkaryl(tolyl) and aralkyl(phenyl methyl) silicon halides. The treatment may be carried out by agitating the finely divided material in a closed container in the presence of vapors of the treating material, i.e., dimethyl dichlorosilane. The amount of treating material and the length of treatment will depend upon the surface area of the inorganic material an the nature of the organo-silicon halide employed. In general, it will be satisfactory to use from about 5% to about 15% by weight of treating agent based on the weight of silica and a time of treatment from the ½ to about 2 hours.

Still another method of rendering the silica hydrophobic is by dispersing it in silicone oil, i.e., in a concentration from about 2 to 10% and heating the dispersion to about 250°-300° C. for about an hour more or less. The hydrophobic silica may then be extracted by centrifuging the mixture after dilution with hexane or a similar type of solvent and drying the resulting solid.

The hydrophobic silica utilized in the novel compositions of the invention will desirably have an average particle size less than about 10 microns and preferably less than about 5 microns. Most preferred is an average particle size from about 0.02 micron to about 1 micron.

The oil carrier for the hydrophobic silica particles may be any non-aqueous carrier which is inert toward the other ingredients of the antifoaming composition. Preferred oil carriers are natural oil, mineral oil and hydrocarbons such a mustard seed oil, castor oil, corn oil, petroleum naphtha, etc. For a more extensive list of suitable carrier oils see U.S. Pat. No. 4,123,383 herein incorporated by reference.

In the practice of the invention, any of the general types of nonionic surface active agents or surfactants may be employed provided that they allow formation of an water-in-oil emulsion. Nonionic surfactants' emulsifying efficiency is related to the polarity of the molecule, that is, the relation between the contribution of the polar hydrophilic head and the non-polar lipophilic tail. This polarity for nonionic surfactants is defined in terms of an empirical quantity which is called the hydrophile-lipophile balance of HLB. The HLB is explained and the method of determining the same is set out in "Nonionic Surfactants" edited by Martin J. Shick, pp. 604–612, published in 1967 by Marcel Deker, Inc., New York. For the purposes of the present invention, a nonionic surfactant having an HLB number less than about 10 is satisfactory. Excellent results have been obtained with an HLB in the range of about 2.0 to about 8.0 especially preferred being 2 to 6. The nonionic surfactants having an HLB in the range of 1 to about 10 are classified as oil-soluble or monomer-soluble.

The nonionic surfactants useful for the purposes of the invention are those falling within the following generic classes and having an HLB in the broad range given above: (1) polyoxyethylene alkyphenols; (2) polyoxyethylene alcohols; (3) polyoxyethylene esters of fatty acids; (4) polyoxyethylene alkylamines; (5) polyoxyethylene alkylamides; (6) polyol surfactants including polyglycerol and polysorbitol esters; and (7) polyalkylene oxide block copolymers. As examples of surfactants including polyglycerol esters; and (7) polyalkylene oxide block copolymers. As examples of surfactants in the above classes having the appropriate HLB there may be named the following: sorbitan trioleate; sorbitan tristearate; polyoxyethylene sorbitol hexastearte; lactylated mono- and diglycerides of fat-forming fatty acids, ethylene glycol fatty acid ester; mono- and diglycerides from the glycerolysis of edible fats; propylene glycol fatty acid ester; propylene glycol monostearate; sorbitan sesquioleates; polyoxyethylene sorbitol 4.5 oleate; glycerol monostearate; decaglyceryl tetraoleate triglyceryl monooleate; sorbitan monooleate; sorbitan monolaurate; sorbitan partial fatty esters; high-molecular-weight fatty amine blend; sorbitan monostearate; diethylene glycol fatty acid ester; polyoxyethylene (2) stearyl ether; polyoxyethylene (2) oleyl ether; polyoxyethylene sorbitol beeswax derivative; polyoxyethylene (2)cetyl ether; diethylene glycol monolaurate (soap-free); sorbitan monopalmitate; high-molecular-weight amine blend; sorbitan monooleate polyoxyethylene ether mixed fatty and resin acids blend; polyoxypropylene mannitol dioleate; polyoxyethylene sorbitol lanolin derivative; polyoxyethylene sorbitol esters of mixed fatty and resin acids; polyoxyethylene fatty acid; polyoxyethylene sorbitol oleate; polyoxyethylene sorbitan monostearate; polyoxyethylene sorbitol tallow esters; polyoxyethylene sorbitol tallow oil; polyoxyethylene lauryl ether; polyoxyethylene sorbitan monooleate; polyoxyethylene sorbitol hexaolete; polyoxyethylene sorbitan tristearate; and polyoxyethylene sorbitan trioleate.

The above compounds have a multiplicity of functional groups and accordingly, a very large number of modifications is possible. Mixtures of said compounds can also be used, for example,, mixtures of sorbitan monooleate and sorbitan monolaurate. Usually the amount of nonionic surfactant employed will be in the range of about 0.005% to about 10% by weight. Preferably, an amount of surfactant in the range of 0.1 to 5.0 by weight is employed. Most preferably, the surfactant is present in the range of 2 to 5% by wt. Especially preferred is a mixture of sorbitan fatty esters in the range of 2.5 to 5 wt. %. For example, a mixture of 50 to 70% sorbitan monolaurate and 30 to 40% sorbitan monooleate, preferably 60% monolaurate and 40% monooleate are suitable as the surfactant.

The following examples are set forth below for purposes of illustrative purposes only. The examples were based on the use of the defoaming composition to prevent or eliminate forming of textile print paste composition utilizing Pastemaker TM, a print paste thickener manufactured by the assignee of the instant application.

BASIC PROCEDURE

A 3.0 gram sample of (1) print paste or (2) Cut Clear was weighed into a 100 ml. polyethylene beaker with 10 ml. markers on the side. Print paste is a mixture of Cut Clear, pigment and binder. (Typically 79.5 wt. % cut clear, 10% binder (E-32 Rohm and Haas), 10% pigment (Blue N2-G American Hoechst) and 0.25% defoamer). Cut clear is a mixture of Pastemaker TM and water with 0.25 wt. % defoamer The sample was diluted to 30 ml. (by beaker marker) was distilled (or deionized) water. The sample need not be mixed into the liquid. The beaker was placed on a single blade Hamilton Beach milkshake mixer with the agitator centered and at the ½ depth point. The motor was controlled by a Variac set at "50" (out of 120). Agitation was carried out for 45 seconds and the foam height is measured with the agitator in place. The liquid level for unagitated liquid is 32 ml. which is considered the "base" height. The difference between 32 ml. and the observed foam height immediately after agitation is the "foam height" of the sample.

Tables I and II below set forth the results using various known defoamers. It can be seen that Foamaster R supplied from Henkel which is a hydrophobic silica in oil carrier gave the best results regarding antifoaming of the Print Paste composition. However, the use of Foamaster R was difficult because the silica particles readily separated from the oil carrier necessitating frequent mixing, and the effectiveness of Foamaster R in aqueous systems was minimal. The defoamer composition of the present invention alleviated these problems associated with Foamaster R by itself.

TABLE I

PRINT PASTE FOAM TEST WITH KNOWN DEFOAMERS

| PRINT PASTE WITH DEFOAMER | FOAM HEIGHT (ml) |
| --- | --- |
| Control (No Defoamer) | 40 |
| Brust RSD-10 | 32 |
| Spectrachem DF-162 | 30 |
| Foamaster DS | 36 |
| Foamaster R | 12 |
| Foamaster III | 30 |
| Foamaster 340 | 32 |

TABLE II

EFFECT OF TIME ON DEFOAMER EFFECTIVENESS

INITIAL DATA

| | Foam Height | |
| --- | --- | --- |
| Sample Name | Cut Clear | Print Paste (ml) |
| Control (No Defoamer) | 24 ml | 34 ml |
| Hydrolab Burst RSD-10 | 12 ml | 34 ml |
| Spectrachem DR-16L | 16 ml | 34 ml |
| Henkel Foamaster R | 10 ml | 26 ml |
| Henkel Foamaster 111 | 8 ml | 32 ml |
| Henkel Foamaster 340 | 8 ml | 32 ml |

DATA AT 15 MINUTE INTERVALS

| | Print Paste (ml) | | |
| --- | --- | --- | --- |
| Sample Name | 2nd Run | 3rd Run | 4th Run |
| Control (No Defoamer) | 34 ml | 42 ml | 30 ml |
| Hydrolab Burst RSD-10 | 36 ml | 42 ml | 38 ml |
| Spectrachem DF-161 | 36 ml | 38 ml | 34 ml |
| Henkel Foamaster R | 34 ml | 28 ml | 34 ml* |
| Henkel Foamaster 111 | 34 ml | 40 ml | 30 ml |
| Henkel Foamaster 340 | 36 ml | 40 ml | 30 ml |

*Foamaster R was the only sample visibly breaking down foam after 4 runs.

A comparison of Foamaster R and the defoamer composition of the present invention are set forth below in Table III. The comparison 15 based on equal weight of the active ingredient (i.e. defoamer). It can readily be seen that the defoaming composition of the present invention performs much more efficiently as based on weight of active ingredients.

TABLE III

COMPARISON OF DEFOAMER EFFICIENCY

| | Foam Height (ml) | |
| --- | --- | --- |
| % Defoamer | Foamaster R | Antifoam Composition of Invention |
| .1% | 14 ml. | 10 ml. |
| .2% | 14 ml. | 10 ml. |
| .5% | 8 ml. | 8 ml. |
| 1% | 6 ml. | 6 ml. |

| | Normalized | | |
| --- | --- | --- | --- |
| % Defoamer | Foam Ht. | % Antifoam Composition of Invention | Foam Ht. |
| .1% Foamaster R | 14 ml. | .25% | 10 ml. |
| .2% Foamaster R | 14 ml. | .05% | 8 ml. |
| .5% Foamaster R | 8 ml. | 1.25% | 6 ml. |

The foregoing description of the preferred embodiments of the present invention have been present for purposes of illustration and description and not intended to be exhaustive. It is intended that the scope of the invention be defined by the claims appended hereto.

What we claim is:

1. An antifoam composition comprising a water-in oil emulsion comprising 20 to 90 wt. % of a defoaming agent consisting essentially of particulate hydrophobic silica in an oil carrier, greater than zero to about 10 wt. % non-ionic surfactant having an HLB number less than about 10, and water to form a water-in oil emulsion.

2. The composition claim 1 wherein the non-ionic surfactant is a mixture of sorbitan monooleate and sorbitan monolaurate.

3. The composition of claim 1 wherein the surfactant has an HLB number of between about 2 to 8.

4. The composition of claim 3 wherein the composition comprises about 30 to 50 wt. % defoaming agent, about 1 to 10 wt. % non-ionic surfactant and remainder water.

5. The composition of claim 4 wherein the non-ionic surfactant is present in an amount ranging from about 2 to 5 weight percent.

6. The composition of claim 1 wherein the surfactant is a mixture of between 70 to 50 wt. % sorbitan monolaurate and 30 to 50 wt. % sorbitan monooleate.

7. A process of manufacturing an antifoaming composition comprising a water in oil emulsion comprising combining 20 to 90 wt. % defoaming agent consisting essentially of particulate hydrophobic silica in a oil carrier, greater than zero to about 10 wt. % non-ionic surfactant having an HLB number of less than bout 10 and water to form said water in oil emulsion and mixing the defoaming agent nonionic surfactant and water to form said water-in oil antifoaming composition.

8. The process of claim 7 wherein the surfactant has an HLB number of between about 2 to 8.

9. The process of claim 7 wherein the surfactant is a mixture of sorbitan monooleate and sorbitan monolaurate.

10. The process of claim 9 wherein the surfactant is present in a amount ranging from about 2 to 5 wt. %.

* * * * *